United States Patent [19]
Inoue et al.

[11] Patent Number: 5,838,059
[45] Date of Patent: Nov. 17, 1998

[54] MULTICHIP IC CARD AND IC CARD SYSTEM USING IT

[75] Inventors: Masayuki Inoue, Yokohama; Shigeyuki Itoh, Kawasaki; Yutaka Takami; Kenji Matsumoto, both of Yokohama; Kotaro Yamashita, Machida, all of Japan

[73] Assignee: Hitachi, Ltd., Tokyo, Japan

[21] Appl. No.: 758,349

[22] Filed: Dec. 3, 1996

[30] Foreign Application Priority Data

Dec. 14, 1995 [JP] Japan ..................... 7-326002

[51] Int. Cl.⁶ ..................... H01L 23/02
[52] U.S. Cl. ............ 257/679; 257/723; 257/724
[58] Field of Search .................. 257/679, 686, 257/685, 723, 724, 691; 235/380

[56] References Cited

U.S. PATENT DOCUMENTS 5,298,724  3/1994  Wratil .

FOREIGN PATENT DOCUMENTS

5-135218  6/1993  Japan .

*Primary Examiner*—Mahshid D. Saadat
*Assistant Examiner*—S. V. Clark
*Attorney, Agent, or Firm*—Fay Sharpe Beall Fagan Minnich & McKee

[57] ABSTRACT

The object of the present invention is to provide a multichip IC card which seems to be a single chip IC card constituted by one chip and in which plural function chips are built. The multichip IC card is provided with a connector 3 for connecting to an interface processor 1, a master chip 4 for controlling a system in a card, at least one function chip 6-1 to 6-n and selection means 5A for connecting the function chip selected by the master chip and the interface processor 1 via the connector 3.

15 Claims, 9 Drawing Sheets

MULTICHIP IC CARD AND IC CARD SYSTEM USING IT

BACKGROUND OF THE INVENTION AND RELATED ART STATEMENT

The present invention relates to a multichip integrated circuit (IC) card and an IC card system using it, particularly relates to an IC card into which a master chip and at least one function chip are built.

An IC card is excellent in security and has been widely applicable. For example, owing to the prior art disclosed in Japanese published unexamined patent application No. H5-256052, an IC card can be utilized in place of a key by controlling entrance and exit by the card.

It is also one of the characteristics of an IC card that a large quantity of information can be stored in an IC card and owing to the prior art disclosed in Japanese published unexamined patent application No. H6-309558, customer information can be stored in an IC card to enable the provision of prompt service.

Further, an IC card starts to be also utilized as a ticket of a vehicle, owing to the prior art disclosed in Japanese published unexamined patent application No. H6-290320, it not only can be used in place of a ticket but is provided with a function to prevent an unfair ride and there is the indication of popularization.

An IC card at present used for such application is a single chip IC card into which a chip provided with one function is built. The number of IC cards owned by an individual is estimated to be increased hereafter together with the popularization of an IC card.

However, it is inefficient to take plural IC cards. Therefore, it is required to collect plural functions in one card. However, it is difficult to collect functions provided by plural cards in one chip in view of security and difference among communication protocols because plural issuers of IC cards exist.

Therefore, a multichip IC card into which plural chips are built is required for such a request. In each chip an individual program is stored, however, in this case, the similar safety to that of a single chip IC card can be maintained because the provision of information is not required between chips even if plural functions are collected in one card.

In the meantime, as an IC card is standardized, a position in which any chip is in contact with equipment is the same. The above-described position is also the same in the case of an IC card according to a noncontact method. When power and a signal are supplied from a common contact to such plural chips, the shortage of power supply and signal strength is caused in case the number of chips is increased.

OBJECT AND SUMMARY OF THE INVENTION

Therefore, the object of the present invention is to solve the above problems when plural chips are built in one card and to provide a multichip IC card provided with suitable constitution wherein plural chips are packaged and which can be used as a single chip IC card in which one chip is constituted.

To solve the above problems and achieve the above object, a multichip IC card according to the present invention is constituted by a connector for connecting an external interface processor and a power source or a signal independent of contact/noncontact, a master chip for controlling the system of the IC card, a selection means for switching a power line and a signal line and one or more function chips constituted by microcomputer chips different in a function.

A multichip IC card wherein plural chips are built can be communicated as a single chip IC card provided with one function chip and the shortage of power supply and signal strength can be avoided by providing such constitution.

DETAILED DESCRIPTION OF PREFERRED EMBODIMENTS

Embodiments according to the present invention will be described below referring to FIGS. 1 to 9. First, reference numbers used in the above drawings will be described.

Figure 1:
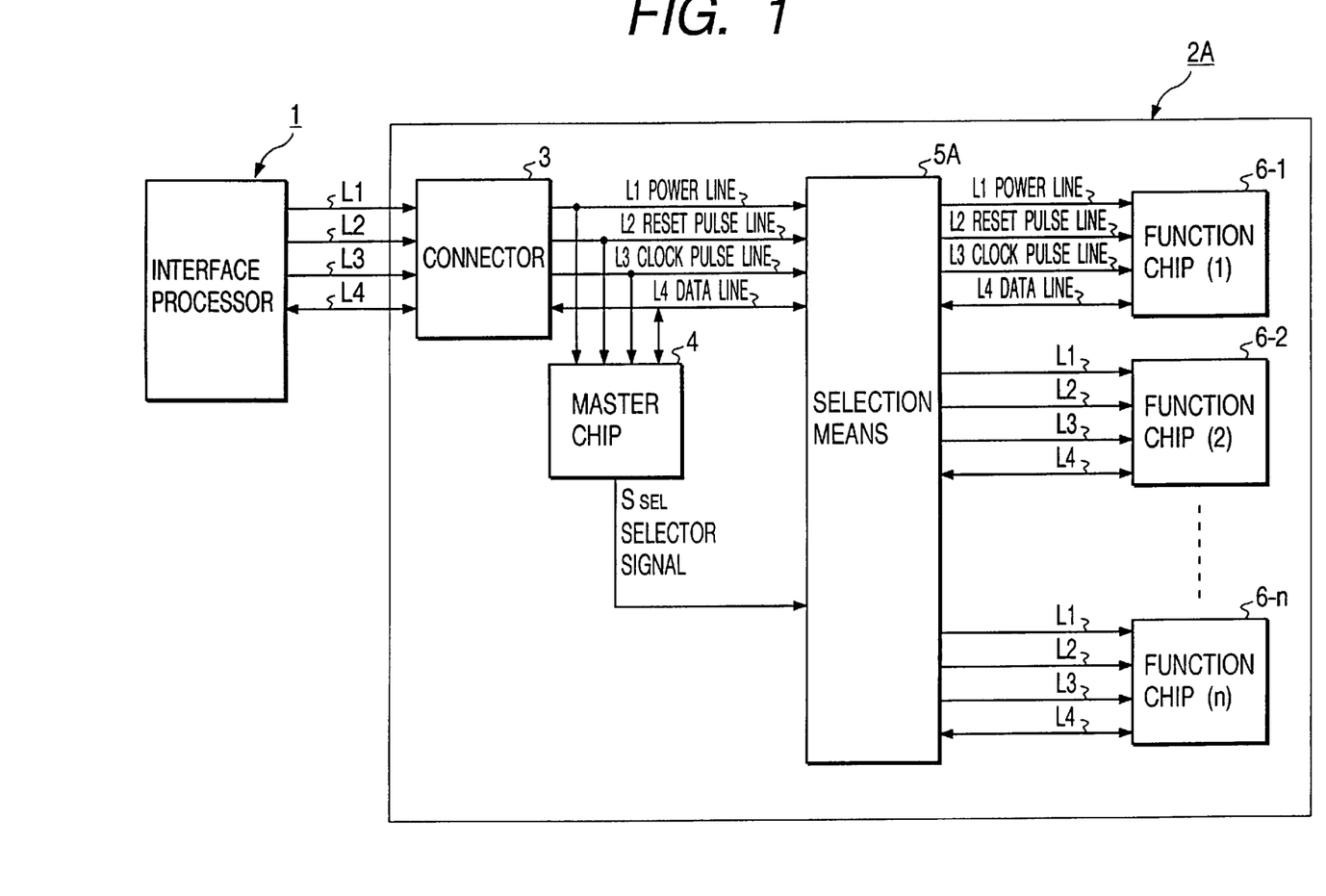
FIG. 1 is a block diagram showing an IC card system using a multichip IC card equivalent to a fist embodiment according to the present invention.

1, 1'. Interface processor
2A, 2B, 2C, 2D, 2E, 2'. Multichip IC card
3, 3'. Connector
4. Master chip
5A, 5B, 5C, 5D. Selection means
6-1, 6-2 to 6-n. Function chip
11. Microcomputer
12. Power source
13, 13'. Connector
14. Oscillation circuit
15. Input means
16. Display means
51. Decoder circuit
52. Reset circuit
53-1, 53-2 to 53-n. Switching circuit
81, 84. Sending/Receiving coil
82, 85. Multiplexing circuit
83, 86. Separating circuit
91. OR gate
L1. Power line
L2. Reset pulse line
L3. Clock pulse line
L4. Data line
L5. Enabling signal line
$S_{SEL}$. Selector signal $S_{END}$. Termination signal
$S_{CUT\ IN}$. Interrupt signal Next, FIG. 1 is a block diagram showing an IC card system using a multichip IC card equivalent to a first embodiment according to the present invention and in FIG. 1, a reference number 1 denotes an interface processor, 2A denotes the multichip IC card equivalent to the first embodiment and the interface processor 1 applies power to the multichip IC card 2A and sends or receives data.

In the multichip IC card 2A, a reference number 3 denotes a connector, 4 denotes a master chip, 5A denotes a selection means and 6-1, 6-2 to 6-n denote a function chip. The connector 3 for connecting to the interface processor 1 and the connector of the interface processor 1 are connected via a power line L1, a reset pulse line L2, a clock pulse line L3 and a data line L4. The master chip 4 for controlling the whole of the multichip IC card 2A and the selection means 5A for selecting each function chip 6-1 to 6-n are connected to the connector 3 in parallel via a power line L1, a reset pulse line L2, a clock pulse line L3 and a data line L4. Each function chip 6-1 to 6-n consists of a microcomputer 20 different in a function and is individually connected to the selection means 5A via a power line L1, a reset pulse line L2, a clock pulse line L3 and a data line L4. The selection means 5A is controlled by a selector signal $S_{SEL}$ from the master chip 4.

Figure 2:
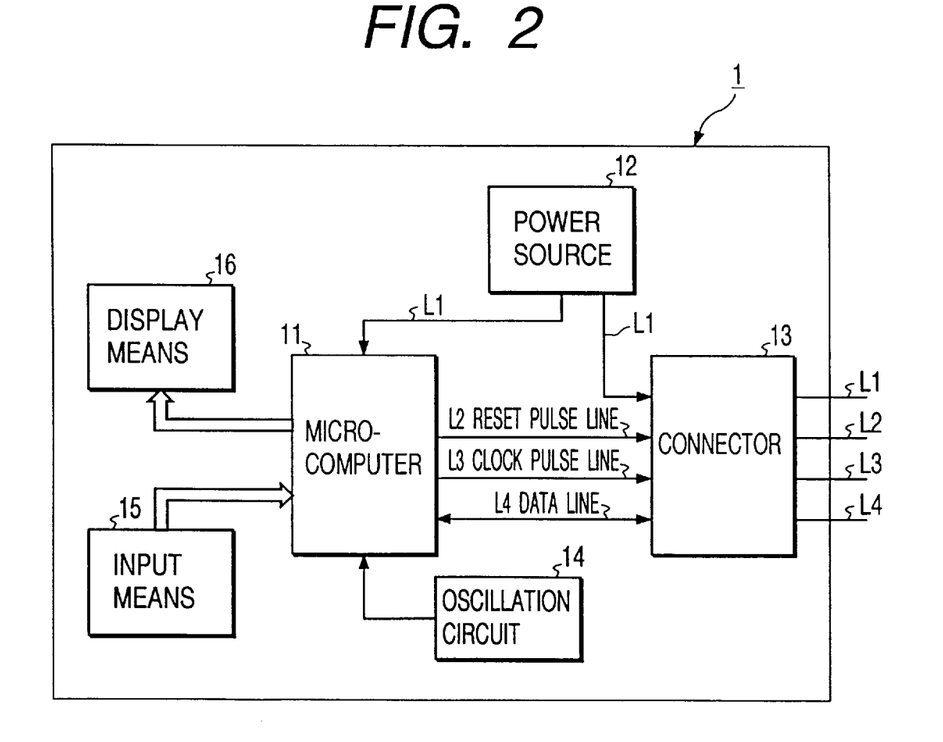
FIG. 2 is a block diagram showing an example of the internal constitution of an interface processor shown in FIG. 1.

FIG. 2 is an internal block diagram showing the interface processor 1 and in FIG. 2, a reference number 11 denotes a microcomputer for controlling the whole of the interface processor 1, 12 denotes a power source, 13 denotes a connector, 14 denotes an oscillation circuit for generating a reference pulse for generating a clock pulse, 15 denotes an input means for inputting data and others and 16 denotes a display means for outputting data and others. The interface processor 1 supplies power from the power source 12 to the multichip IC card 2A via the connector 13 under the control of the microcomputer 11, outputs a clock pulse and a reset pulse to the multichip IC card 2A via the connector 13 and further, communicates data with the multichip IC card 2A via the connector 13. The microcomputer 11 of the interface processor 1 according to this embodiment is provided with a function for reading data from the multichip IC card 2A and writing data to the multichip IC card 2A, however, according to circumstances, the microcomputer may be provided with only a function for reading data from the multichip IC card 2A.

Figure 3:
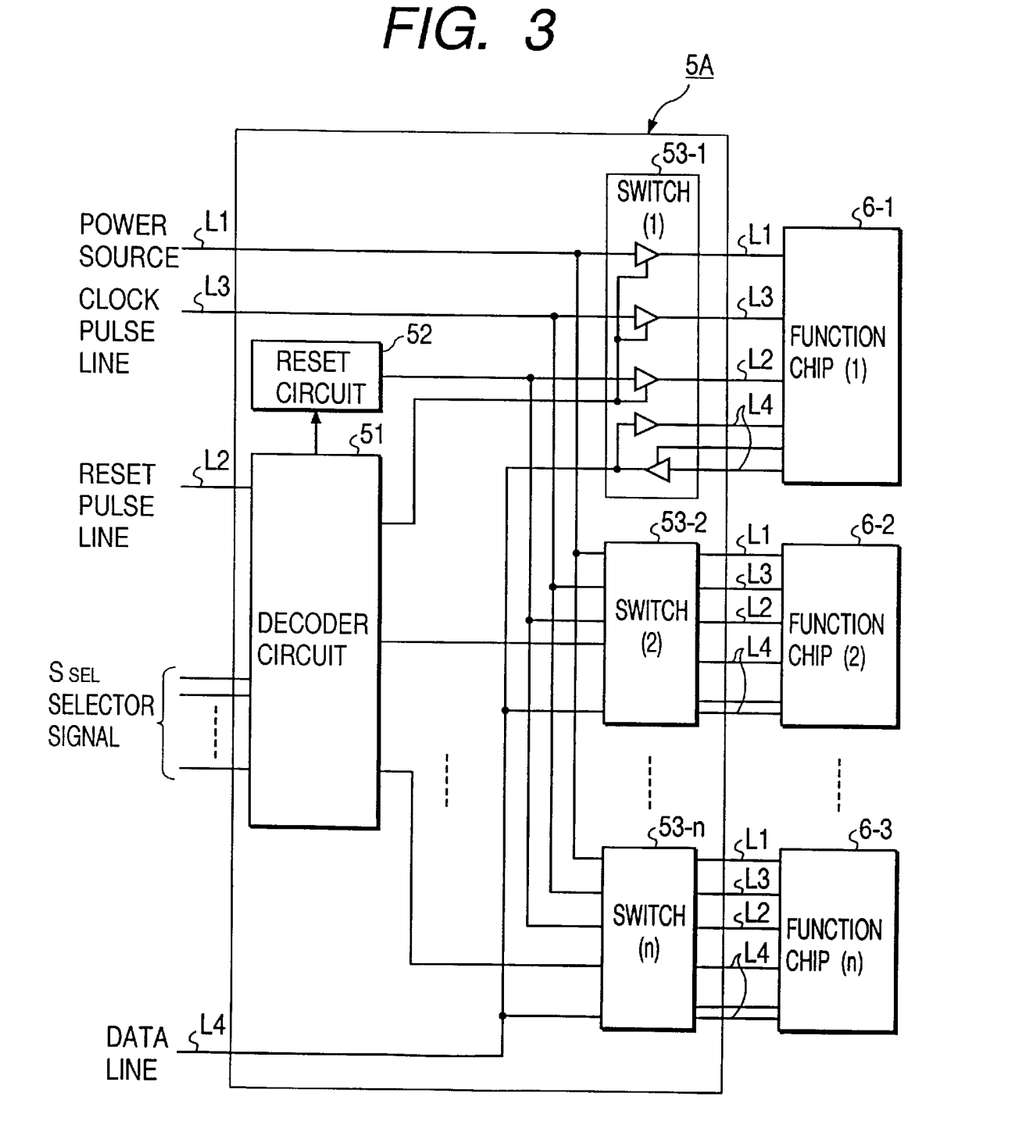
FIG. 3 is a block diagram showing an example of the internal constitution of a selection means in the multichip IC card shown in FIG. 1.

FIG. 3 is an internal block diagram showing the above selection means 5A in the multichip IC card 2A and in FIG. 3, a reference number 51 denotes a decoder circuit, 52 denotes a reset circuit and 53-1, 53-2 to 53-n are switching circuits respectively corresponding to the above function chips 6-1 to 6-n. The decoder circuit 51 decodes a selector signal $S_{SEL}$ from the master chip 4 and outputs a control signal for turning on/off each switching circuit 53-1 to 53-n. That is, basically: the decoder circuit 51 turns on one of the switching circuits 53-1 to 53-n by selecting one of n pieces and turns off the other switching circuits according to the combination of selector signals $S_{SEL}$, however, the decoder circuit 51 can be also set so that no switching circuit 53-1 to 53-n is turned on (no function chip 6-1 to 6-n is selected) according to a reset pulse from an external device. The reset circuit 52 is a circuit for generating a reset pulse to be sent to a selected function chip, generates a reset pulse when the decoder circuit 51 is switched from a state in which none is selected to a state in which a switching circuit is selected and hereby, a selected function chip is reset by a power on reset.

Figure 4:
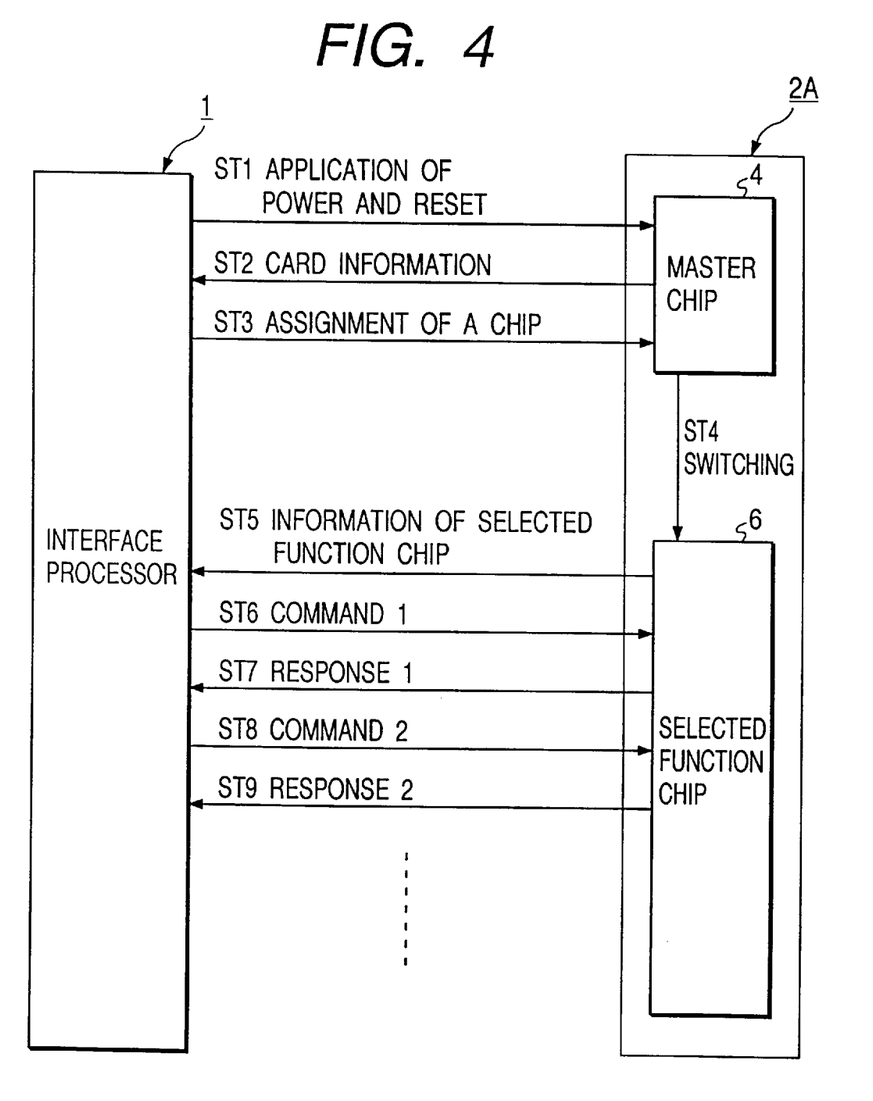
FIG. 4 is an explanatory drawing schematically showing an example of a processing flow of the interface processor and the multichip IC card according to the first embodiment of the present invention.

FIG. 4 schematically shows an example of a processing flow between the interface processor 1 and the multichip IC card 2A. When the multichip IC card 2A is inserted into the interface processor 1, the interface processor 1 applies power to the multichip IC card 2A and resets it in a step ST1. At this time, in the multichip IC card 2A, only the master chip 4 is operated and any function chip 6-1 to 6-n hardly consumes power or does not consume power at all.

The information of each function chip 6-1 to 6-n which is built in the multichip IC card 2A is stored in the master chip 4 and the master chip 4 returns information that this IC card is a multichip one and the information of each function chip to the interface processor 1 as card information in response to a reset from the interface processor 1 in a step ST2. The interface processor 1 determines whether a function chip to be communicated exists or not based upon received card information and if the corresponding function chip exists, the interface processor specifies the function chip to the master chip 4 in a step ST3. Hereby, after the specified function chip is selected by the selection means 5A, the master chip 4 switches itself to a mode in which no power is consumed in a step ST4.

After the step ST4, the selected function chip 6 and the interface processor 1 are directly connected, the information of this function chip 6 itself is sent from the selected function chip 6 to the interface processor 1 in a step ST5 and thereafter, a command from the interface processor 1 and a response from the function chip 6 in response to it are sent and received in steps ST6, ST7, ST8, ST9 etc. Therefore, after the step ST5, the multichip IC card 2A operates as a single chip IC card into which one function chip is built.

The details of the operation according to this embodiment will be further described below. N pieces of function chips 6-1 to 6-n are connected to the selection means 5A and one or more function chips may be built, however, to simplify description, two types of function chips of a chip for an entrance and exit system and a chip for a ticket system shall be packaged in the multichip IC card 2A.

When the multichip IC card 2A equivalent to this embodiment is connected to, for example the interface processor 1 for the entrance and exit system and reset by it, power is supplied, a signal are sent to only the master chip 4 and the selection means 5A is set in a state in which no function chip is selected by a reset pulse from the interface processor 1. After the reset, the interface processor 1 is placed in the wait state for data from the multichip IC card 2A. The master chip 4 returns information that this IC card is a multichip one and information that two function chips of a chip for the entrance and exit system and a chip for the ticket system exist in the same card to the interface processor 1 as card information in response to a reset from the interface processor 1 and is placed in the wait state for data from the interface processor 1.

The interface processor 1 verifies that the corresponding function chips exist in the IC card in communication with the interface processor based upon the above card information, specifies the function chips to the master chip 4 and again is placed in the wait state for data. In this case, as the interface processor 1 functions as the entrance and exit system, the chip for the entrance and exit system is specified. The master chip 4 controls the selection means 5A so that the chip for the entrance and exit system which is the specified function chip is selected and resets the chip for the entrance and exit system via the selection means 5A. At the same time as this switching, the master chip 4 is placed in a mode in which no power is consumed (that is, for example at this time, the connector 3 and the master chip 4 are not connected and no power is not consumed).

By the above operation, the selected chip for the entrance and exit system is reset by a power on reset and the information of the selected chip itself is returned to the entrance and exit system which is the interface processor 1 via the directly connected connector 3. As the interface processor 1 communicates with the multichip IC card as it communicates with a conventional single chip IC card after the reception of this information, this multichip IC card 2A functions as a card for the entrance and exit system.

Figure 5:
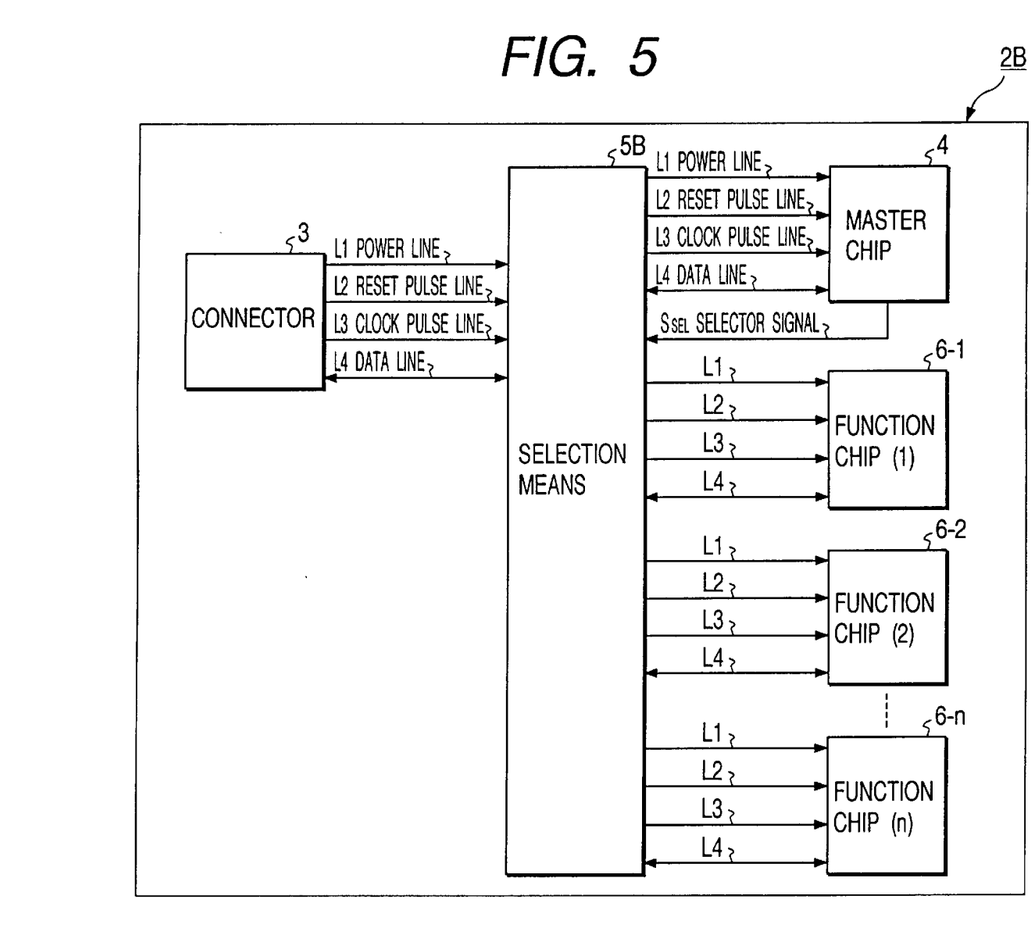
FIG. 5 is a block diagram showing a multichip IC card equivalent to a second embodiment according to the present invention.

FIG. 5 is a block diagram showing a multichip IC card equivalent to second embodiment according to the present invention and in FIG. 5, the same reference number is allocated to the same thing as in FIG. 1 and to avoid repetition, the description of them is omitted (this is the same in embodiments later described).

In the multichip IC card 2B equivalent to this embodiment, only a selection means 5B is directly connected to a connector 3 via a power line L1, a reset pulse line L2, a clock pulse line L3 and a data line L4. A master chip 4 and each function chip 6-1 to 6-n are individually connected to the selection means 5B via a power line L1, a reset pulse line L2, a clock pulse line L3 and a data line L4. The selection means 5B is controlled by a selector signal $S_{SEL}$ from the master chip 4 and selects one of function chips. The master chip 4 is set to the initial value of the selection means 5B at the time of a reset when the multichip IC card 2B receives a reset pulse from an external device.

When the multichip IC card 2B equivalent to this embodiment is inserted into the interface processor 1 and reset, power is supplied and a signal is sent to only the master chip 4 which is the initial value of the selection means 5B. At this time, no function chip 6-1 to 6-n is-connected to the connector 3. After the interface processor 1 resets the multichip IC card 2B, it is placed in the wait state for data.

The master chip 4 returns information that this IC card is a multichip one and the information of each function ship in the same card to the interface processor 1 as card information in response to a reset from the interface processor 1 and is placed in the wait state for data from the interface processor 1. The interface processor 1 verifies that the corresponding function chip exists in the IC card in communication with the interface processor based upon the above card information, specifies the function chip to the master chip 4 and again is placed in the wait state for data. Hereby, the master chip 4 switches the selection means 5B so that the specified function chip is selected and resets the selected function chip via the selection means 5B. At the same time as this switching, power is not supplied to the master chip 4 and pulse lines are also disconnected.

The selected function chip is reset by a power on reset and returns the information of itself to the interface processor 1. After the reception of this information, the interface processor 1 communicates with the multichip IC card as it communicates with a conventional single chip IC card.

Figure 6:
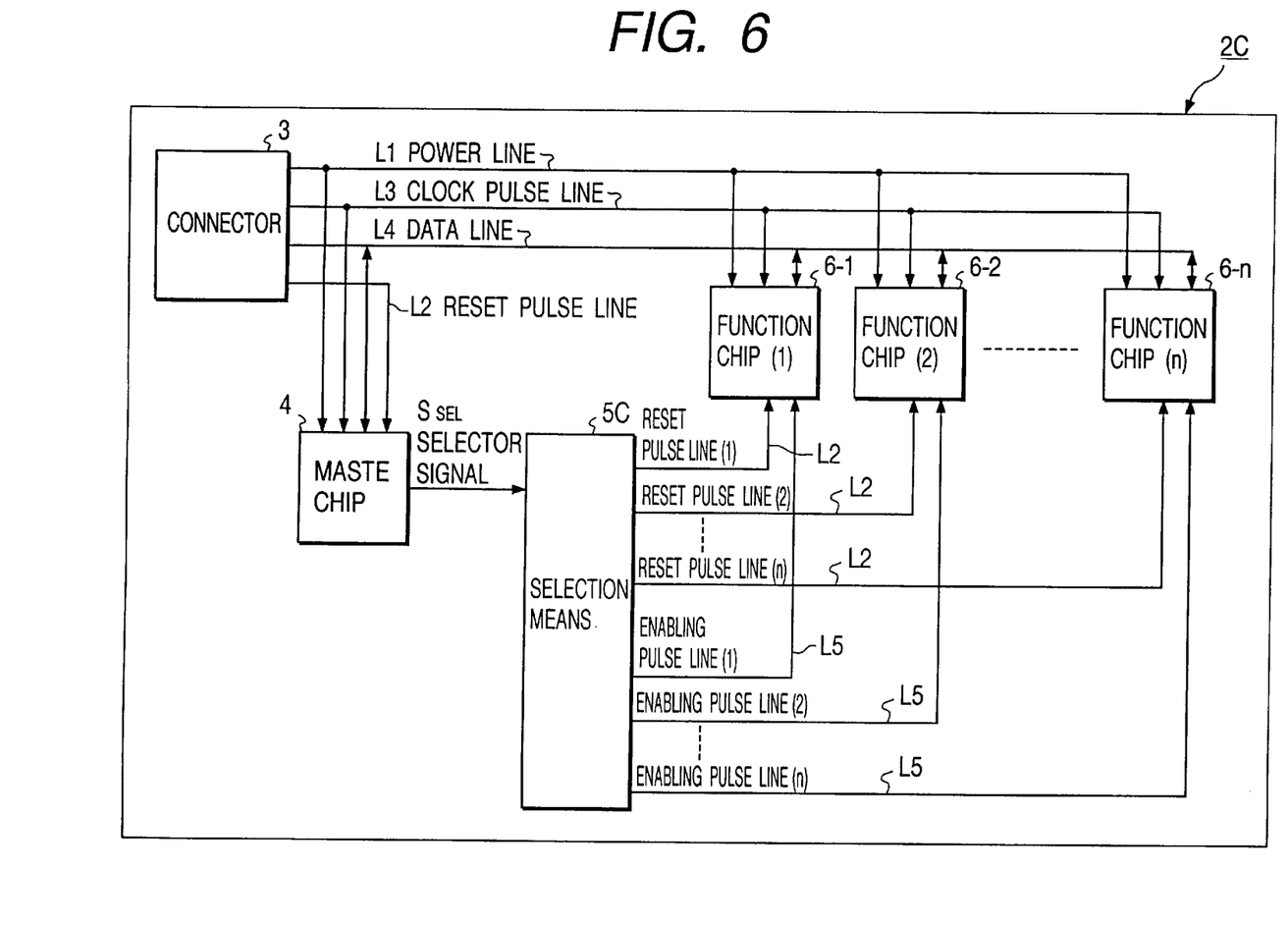
FIG. 6 is a block diagram showing a multichip IC card equivalent to a third embodiment according to the present invention.

FIG. 6 is a block diagram showing a multichip IC card equivalent to a third embodiment according to the present invention. In the multichip IC card 2C equivalent to this embodiment, any chip in the IC card (a master chip 4 and each function chip 6-1 to 6-n) is individually connected to a connector 3 via a power line L1, a clock pulse line L3 and a data line L4 and further, the connector 3 and the master chip 4 are also connected via a reset pulse line L2. A selection means 5C is controlled by a selector signal $S_{SEL}$ from the master chip 4 and selects one of function chips. The selection means 5C and each function chip 6-1 to 6-n are connected via a pair of a reset pulse line L2 and an enabling signal line L5. The initial value of the selection means 5C when the master chip is reset is a state in which no function chip 6-1 to 6-n to which the enabling signal line is connected is selected. In a state in which no function chip 6-1 to 6-n is selected, wiring between each function chip and the connector 3 is set so that it has high impedance.

When the multichip IC card 2C equivalent to this embodiment is inserted into the interface processor 1 and reset, power is supplied and a signal is sent to only the master chip 4 because any function chip 6-1 to 6-n is disconnected from the selection means 5C as an initial value. After the interface processor 1 resets the multichip IC card 2C, it is placed in the wait state for data.

The master chip 4 returns information that this IC card is a multichip one and the information of each function chip in the same card to the interface processor 1 as card information in response to the reset from the interface processor 1 and is placed in the wait state for data from the interface processor 1. The interface processor 1 verifies that the corresponding function chip exists in the IC card in communication with the interface processor based upon the above card information, specifies the function chip to the master chip 4 and again is placed in the wait state for data. Hereby, the master chip 4 sends a selector signal $S_{SEL}$ for operating the specified function chip to the selection means 5C and the selection means 5C sends an enabling signal and reset pulse to the selected function chip. At the same time as this selection of the function chip, the master chip 4 is placed in a state in which no power is consumed.

The selected function chip is reset by a power on reset and returns the information of itself to the interface processor 1 via the directly connected connector 3. After the reception of this information, the interface processor 1 communicates with the multichip IC card as it communicates with a conventional signal chip IC card.

Figure 7:
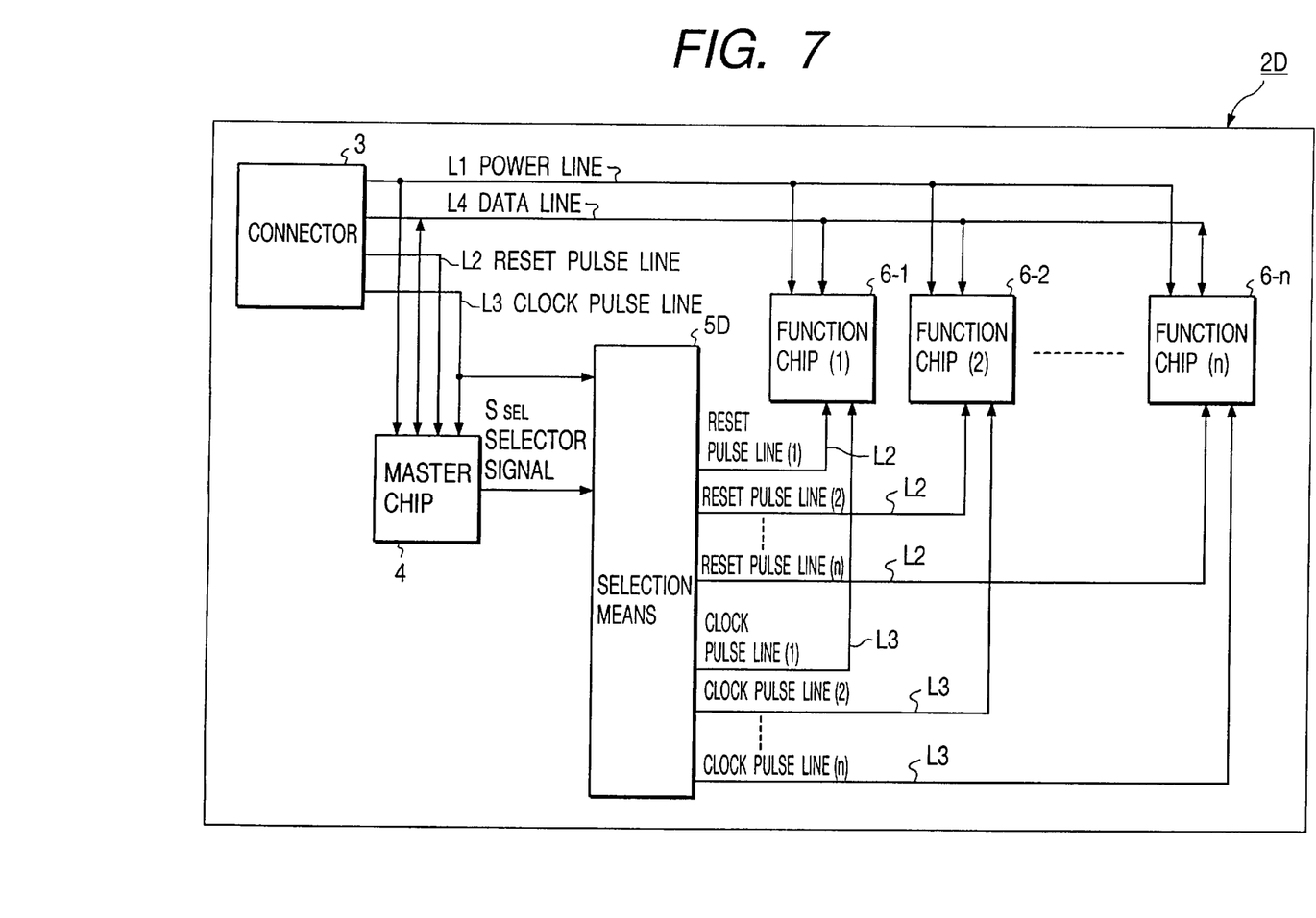
FIG. 7 is a block diagram showing a multichip IC card equivalent to a fourth embodiment according to the present invention.

FIG. 7 is a block diagram showing a multichip IC card equivalent to a fourth embodiment according to the present invention. In the multichip IC card 2D equivalent to this embodiment, any chip in the IC card (a master chip 4 and each function chip 6-1 to 6-n) is individually connected to a connector 3 via a power line L1 and a data line L4, further the connector 3 and the master chip 4 is also connected via a reset pulse line L2 and a clock pulse line L3 and the clock pulse line L3 from the connector 3 is also connected to a selection means 5D. The selection means 5D is controlled by a selector signal $S_{SEL}$ from the master chip 4 and selects one of function chips. The selection means 5D and each function chip 6-1 to 6-n are connected via a pair of a reset pulse line L2 and a clock pulse line L3. The initial value of the output of the selection means 5D when the master chip is reset is a state in which a clock pulse is stopped and a reset state.

When the multichip IC card 2D equivalent to this embodiment is inserted into the interface processor 1 and reset, only the master chip 4 all the signals of which are connected to the connector 3 is operated because the initial value of the output of the selection means 5D is a state in which a clock pulse is stopped and a reset state. As any function chip 6-1 to 6-n is in a state in which a clock pulse is stopped at this time, little power is consumed even if power is applied. After the interface processor 1 resets the multichip IC card 2D, it is placed in the wait state for data.

The master chip 4 returns information that this IC card is a multichip one and the information of each function chip in the same card to the interface processor 1 as card information in response to the reset from the interface processor and is placed in the wait state for data from the interface processor 1. The interface processor 1 verifies that the corresponding function chip exists in the IC card in communication with the interface processor based upon the above card information, specifies the function chip to the master chip 4 and again is placed in the wait state for data. Hereby, the master chip 4 sends a selector signal $S_{SEL}$ to the selection means 5D so that the specified function chip is operated and a clock pulse is supplied from the selection means 5D to the selected function chip. At the same time as this selection of the function chip, the master chip 4 is placed in a state in which no power is consumed.

A reset pulse to the selected function chip is canceled, the selected function chip is placed in a power on reset state and returns the information of itself to the interface processor 1 via the directly connected connector 3. After the reception of this information, the interface processor 1 communicates with the multichip IC card as it communicates with a conventional single chip IC card.

In the above first to fourth embodiments, the multichip IC card and the interface processor are connected via the connector and each line is independent, however, each signal including a power source may be multiplexed. Further, in an IC card system in which the interface processor and the multichip IC card are not connected, the similar system can be also constructed.

Figure 8:
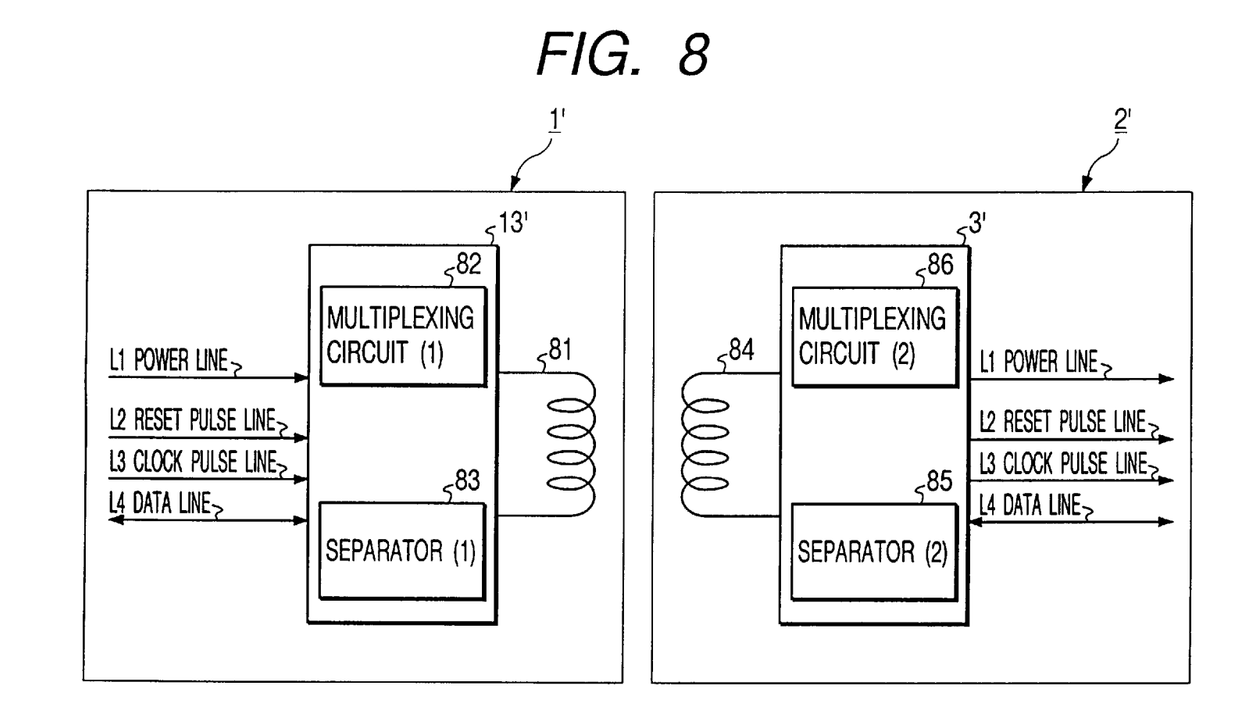
FIG. 8 is a block diagram showing the main part of an IC card system using a multichip IC card equivalent to a fifth embodiment according to the present invention.

FIG. 8 is a block diagram showing an IC card system using a multichip IC card equivalent to a fifth embodiment according to the present invention and this embodiment shows an example in which a signal including a power source is multiplexed and is sent/received without connecting the interface processor and the multichip IC card. In FIG. 8, a reference number 1' denotes an interface processor and 2' denotes a multichip IC card. In the interface processor 1', a reference number 81 denotes a sending/receiving coil, 13' denotes a connector and the connector 13' is provided with a multiplexing circuit 82 provided with a function for multiplexing power and each signal and sending it and a separating circuit 83 provided with a function for receiving a multiplexed signal and separating it into power and each signal. In the multichip IC card 2', a reference number 84 denotes a sending/receiving coil, 3' denotes a connector and the connector 3' is provided with a multiplexing circuit 85 provided with a function for multiplexing power and each signal and sending it and a separating circuit 86 provided with a function for receiving a multiplexed signal and separating it into power and each signal.

As in the above embodiments, a case in which a power source and three signals (a reset pulse, a clock pulse and data) are transmitted from the interface processor 1' to the multichip IC card 2' will be described below. A power line L1 and three signal lines L2, L3 and L4 in the interface processor 1' are connected to the connector 13', a power source and three signals are input to the multiplexing circuit 82 of the connector 13' and multiplexed. The output of the multiplexing circuit 82 is converted to magnetic change by the sending/receiving coil 81. This magnetic change is transmitted to the sending/receiving coil 84 of the multichip IC card 2' by magnetic coupling without contact, is converted to an electric signal by the sending/receiving coil 84 and is input to the separating circuit 86 of the connector 3'. In the separating circuit 86, the multiplexed power source and three signals are separated into a power source and each signal which are equal to those in the above embodiments. The transmission from the multichip IC card 2' to the interface processor 1' is also the same.

According to the present invention, a multichip IC card and a single chip IC card can be utilized together by judging the type by the software of the interface processor based upon card information sent from the IC card after the IC card is reset. For example, if card information that an IC card is a multichip one is sent, the IC card in communication is determined a multichip IC card and a function chip is specified. If the information of a chip is directly sent, the IC card is determined a single chip one and a conventional communication procedure may be executed.

Figure 9:
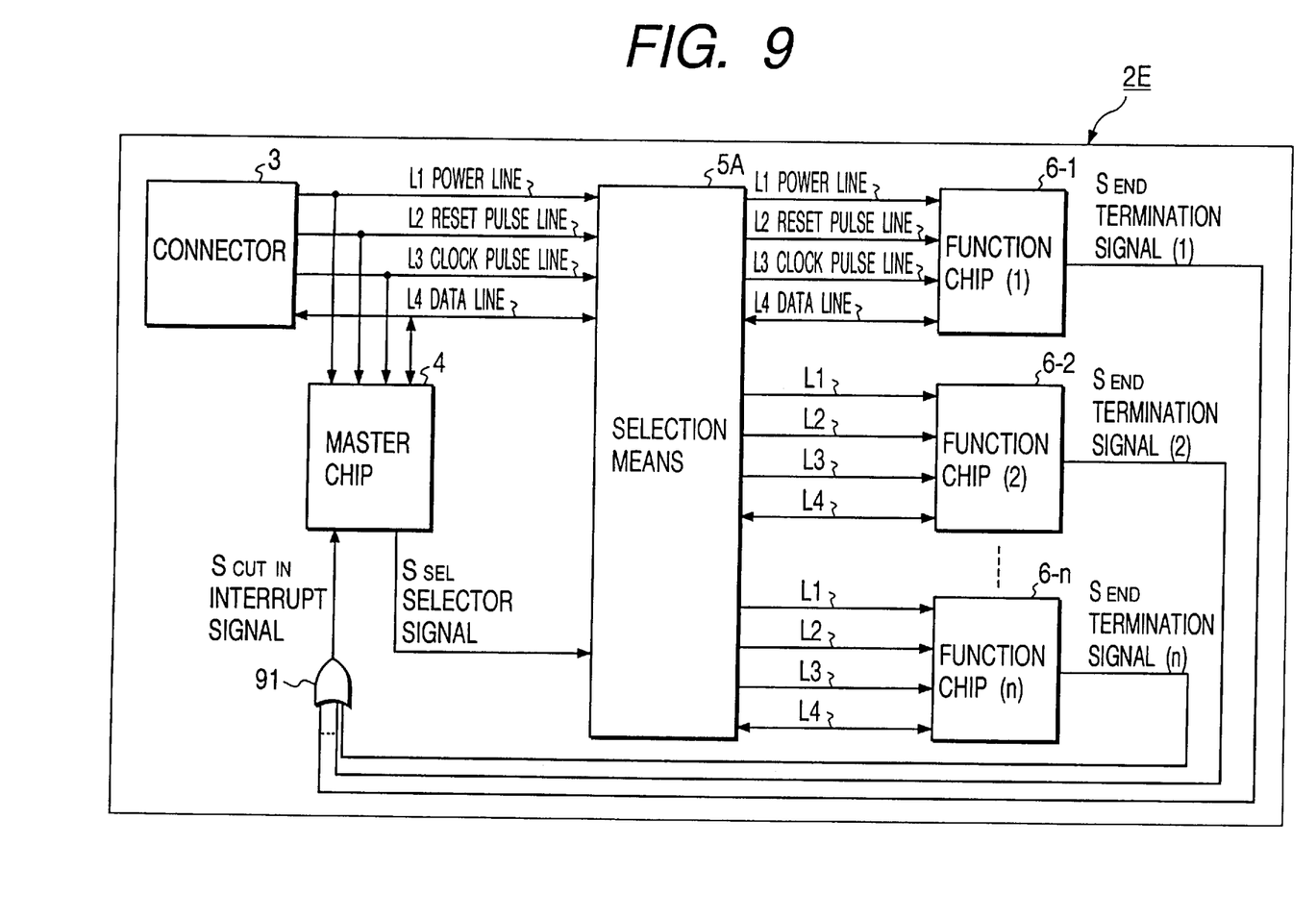
FIG. 9 is a block diagram showing a multichip IC card equivalent to a sixth embodiment according to the present invention.

According to the present invention, plural function chips can be also continuously operated. FIG. 9 is a block diagram showing a multichip IC card equivalent to a sixth embodiment according to the present invention and this embodiment shows an example in which termination is transmitted from a function chip to a master chip to return control to the master chip.

In a multichip IC card 2E equivalent to this embodiment, a termination signal $S_{END}$ from each function chip 6-1 to 6-n is input to the interrupt terminal of the master chip 4 via an OR gate 91 as an interrupt signal $S_{CUT\_IN}$. When the operation of a selected function chip is terminated, a termination signal $S_{END}$ showing it is output and an interrupt signal $S_{CUT\_IN}$ is input to the master chip 4. Hereby, the master chip 4 is restored from a state in which power is saved, a chip in communication with the interface processor 1 is switched from the function chip operated heretofore to the master chip 4 and the master chip 4 can be communicated with the interface processor 1. Afterward, the interface processor 1 specifies the next function chip, the master chip 4 switches function chips according to the specification and is placed again in a state in which power is saved.

This embodiment is based upon the constitution shown in FIG. 1, however, it is obvious that in each embodiment shown in FIGS. 5 to 7, a function equal to that in this embodiment can be also realized. For an example of such application, an example in which after one of function chips is checked in authentication as a cipher processing chip for security, it communicates with a desired function chip can be given.

In the present invention, as the above interface processor has only to be provided with a function for accessing to an IC card, it is not necessarily required to be provided with a function for rewriting data stored in a function chip in an IC card. For example, an application in which an IC card is utilized as a key for entering a room or exiting from it will be described below. The password of a key is written in an IC card by a host interface processor for controlling a card. When a user enters a room or exits from the room, he/she inserts this IC card into an interface processor installed on a door, inputs its password and can enter the room if the password in the IC card and the password input by the user are equal. In the case of such a system, a function for rewriting data in an IC card is required for a host interface processor, however, as an interface processor installed on a door only compares whether a password stored in a card and a password set so that entrance or exit is allowed are equal or not, it has only to be provided with a function for reading data stored in the IC card.

According to the present invention, a function except controlling an IC card may be also provided to a master chip. For example, a function for an authentication check may be provided to a master chip. This can be realized by performing authentication check processing, for example in a flow shown in FIG. 4 when an interface processor and a master chip in a multichip IC card communicate.

According to the present invention, as the base of a multichip IC card, a card in which only wiring connected to a connector, a master chip, a selection means and each function chip is given may be created, if necessary, desired function chips may be added and the information may be written to the master chip.

Desired functions can be packaged in one card by beforehand creating a multichip IC card provided with all the function blocks according to the present invention and writing a program in a master chip and function chips if necessary. If writing processing using a communication line is used for this writing operation, the owner of an IC card can minimize time required for chip adding operation. When compared with a method of packaging a new chip, it is more convenient because an IC card is not required to be sent to a packaging process.

As a multichip IC card according to the present invention is basically constituted so that only one chip always functions, there is no problem even if many function chips exist in the same IC card. Therefore, a thin-type chip can be packaged on both surfaces of an IC card or can be also laminated.

As described above, according to the present invention, as only required chips in a multichip IC card are connected to an interface processor, the multichip IC card can be realized as the same IC card as a single chip IC card consisting of one chip without causing the shortage of power supply and signal strength.

We claim:

1. A multichip IC card connected to an external device having a microprocessor, the multichip IC card comprising:
   a connector for connecting the card to the external device;
   a master chip connected to said connector for controlling a system in the card;
   at least one function chip connected to the connector and the master chip; and
   selection means, connected to the connector, the master chip, and the at least one function chip, for selecting one of the function chips based on an instruction from said master chip and sending/receiving information stored in the selected function chip to/from the external device via said connector, the instruction for selecting the one function chip being based upon a designation of the function chip received by the master chip from the external device, the master chip ceasing to control the system after the function chip is selected.

2. The multichip IC card according to claim 1, wherein:
   said selection means can electrically separate all the above function chips so as to operate only said master chip.

3. The multichip IC card according to claim 1, wherein:
   said selection means can place all the above function chips in a state in which no or little power is consumed so as to operate only said master chip.

4. The multichip IC card according to claim 1, wherein:
   after said master chip operates upon said selection means to select one of the above function chips, it can place itself in a state in which no power is consumed.

5. A multichip IC card, comprising:
   a connector for connecting to an external device;
   a master chip which can be connected to said connector for controlling a system in the card;
   at least one function chip;
   a power line and at least one signal line being connected from said connector to said master chip;
   a selection means for selecting one of the function chins according to an instruction from said master chip and sending/receiving information stored in the selected function chip to/from an external device via said connector, said selection means being connected to said connector in parallel with said master chip and controlled by said master chip;
   the power line and the, signal line connected from said connector to said selection means being connected to an individual function chip via said selection means; and
   the selected function chip being operated by enabling a power line and a signal line connected to the function chip selected by said selection means.

6. A multichip IC card, comprising:
   a connector for connecting to an external device:
   a master chip which can be connected to said connector for controlling a system in the card;
   at least one function chip;
   a power line and at least one signal line being connected from said connector to said selection means;
   a selection means controlled by said master chip for selecting one of the function chips according to an instruction from said master chip and sending/receiving information stored in the selected function chip to/from an external device via said connector;
   the power line and the signal line connected from said connector to said selection means being connected to an individual function chip and said master chip via said selection means;
   the selected function chip being operated by enabling a power line and a signal line connected to the function chip selected by said selection means; and
   said selection means being provided with a function for selecting said master chip by a reset.

7. A multichip IC card, comprising:
   a connector for connecting to an external device;
   a master chin which can be connected to said connector for controlling a system in the card;
   at least one function chip, said function chip being provided with a function for electronically separating a power line and one or more signal lines connected to said connector by an enabling signal; and
   a selection means for selecting one of the function chips according to an instruction from said master chip and sending/receiving information stored in the selected function chip to/from an external device via said connector, said selection means being provided with a function for generating the enabling signal and the reset signal of the selected function chip by a selector signal sent from said master chip.

8. A multichip IC card, comprising:
   a connector for connecting to an external device;
   a master chip which can be connected to said connector for controlling a system in the card;
   at least one function chip, said function chip being provided with a function for electronically separating a power line and one or more signal lines connected to said connector during a reset period; and
   a selection means for selecting one of the function chips according to an instruction from said master chip and sending/receiving information stored in the selected function chip to/from an external device via said connector, said selection means being provided with a function for canceling the reset pulse and generating the clock pulse of the selected function chip by a selector signal sent from said master chip.

9. The multichip IC card according to claim 1, wherein:
   means for restarting said master chip by a signal from said function chip is provided.

10. A multichip IC card, comprising:
    a connector for connecting to an external device, the connector including a means for multiplexing or separating at least one power line and at least one signal line;

a master chip which can be connected to said connector for controlling a system in the card;

at least one function chip; and a selection means for selecting one of the function chips according to an instruction from said master chip and sending/receiving information stored in the selected function chip to/from an external device via said connector.

11. The multichip IC card according to claim 1, wherein:

the connector includes means for connecting, without contact, at least one power line and at least one signal line.

12. The multichip IC card according to claim 1, wherein:

the connector includes means for multiplexing or separating all of at least one power line and at least one signal line into a single line.

13. The multichip IC card according to claim 1, wherein:

said external device is an interface processor which is provided with a function for reading and writing data from/to said multichip IC card.

14. The multichip IC card according to claim 1, wherein:

said external device is an interface processor which is provided with only a function for reading data from said multichip IC card.

15. The multichip IC card according to claim 1, wherein:

the connector includes means for multiplexing or separating all of at least one power line and at least one signal line into an arbitrary number of lines.

* * * * *